United States Patent
Feng et al.

(10) Patent No.: US 11,120,018 B2
(45) Date of Patent: Sep. 14, 2021

(54) SPARK QUERY METHOD AND SYSTEM SUPPORTING TRUSTED COMPUTING

(71) Applicant: BAIDU ONLINE NETWORK TECHNOLOGY (BEIJING) CO., LTD., Beijing (CN)

(72) Inventors: Zhi Feng, Beijing (CN); Yu Zhang, Beijing (CN); Ran Duan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 130 days.

(21) Appl. No.: 16/600,717

(22) Filed: Oct. 14, 2019

(65) Prior Publication Data
US 2020/0151170 A1    May 14, 2020

(30) Foreign Application Priority Data
Nov. 14, 2018 (CN) .......................... 201811352881.8

(51) Int. Cl.
*G06F 16/242* (2019.01)
*G06F 16/2453* (2019.01)
(Continued)

(52) U.S. Cl.
CPC .... *G06F 16/2448* (2019.01); *G06F 16/24545* (2019.01); *G06F 16/252* (2019.01); *G06F 21/6227* (2013.01)

(58) Field of Classification Search
CPC .. G06F 16/252; G06F 21/76; G06F 16/24545; G06F 21/57; G06F 21/6227;
(Continued)

(56) References Cited

U.S. PATENT DOCUMENTS 7,685,083 B2 *   3/2010  Fairweather ....... G06K 13/0825
                                                706/45
8,589,432 B2 * 11/2013  Zhang ............... G06F 16/24568
                                                707/769
(Continued)

FOREIGN PATENT DOCUMENTS

CN    105279286 A    1/2016
CN    106063189 A   10/2016
(Continued)

OTHER PUBLICATIONS

Zheng, Wenting et al., "Opaque: An Oblivious and Encrypted Distributed Analytics Platform", The Proceedings of the 14th USENIX Symposium on Networked Systems Design and Implementation (NSDI '17), Mar. 27-29, 2017, pp. 282-298. (Year: 2017).*
(Continued)

*Primary Examiner* — Shahid A Alam
(74) *Attorney, Agent, or Firm* — Brooks Kushman P.C.

(57) ABSTRACT

The present disclosure provides a spark query method and system supporting trusted computing. The method comprises receiving a SQL query statement input by a user; performing parsing, logical plan analysis, logical plan optimization and physical plan generation for the SQL query statement; re-implementing an operator in the physical plan by using SGX API, and generating an execution code; invoking an enclave trusted environment to implement trusted computing for the operator, and executing the execution code. Through the present disclosure, safety of data during the calculation is ensured while the query request is processed in parallel through the spark architecture. Moreover, the spark interface provides the user with more available service and is user-friendly.

7 Claims, 2 Drawing Sheets

(51) Int. Cl.
*G06F 16/25* (2019.01)
*G06F 21/62* (2013.01)

(58) Field of Classification Search
CPC .. G06F 16/2471; G06F 16/2448; G06F 16/27; G06F 21/123; G06F 21/53
USPC .................................................. 707/718, 769
See application file for complete search history.

(56) References Cited

U.S. PATENT DOCUMENTS

| | | | | |
|---|---|---|---|---|
| 2011/0302151 | A1* | 12/2011 | Abadi | G06F 16/2456 707/714 |
| 2012/0005190 | A1* | 1/2012 | Faerber | G06F 16/24524 707/718 |
| 2012/0239681 | A1* | 9/2012 | Zhang | G06F 16/24575 707/769 |
| 2013/0311509 | A1* | 11/2013 | Sorkin | G06F 16/2228 707/769 |
| 2014/0214888 | A1* | 7/2014 | Marquardt | G06F 16/284 707/769 |
| 2015/0142847 | A1* | 5/2015 | Neels | G06F 16/27 707/769 |
| 2016/0239544 | A1* | 8/2016 | Kondo | G06F 16/2291 707/719 |

FOREIGN PATENT DOCUMENTS

| | | |
|---|---|---|
| CN | 107122443 A | 9/2017 |
| CN | 107506659 A | 12/2017 |

OTHER PUBLICATIONS

Chinese Office Action dated Dec. 6, 2019, for related Chinese Appln. No. 201811352881.8; 3 Pages.
Chinese Search Report dated Feb. 12, 2020 for related Chinese Appln. No. 201811352881.8; 2 Pages.
Chinese Notice of Allowance dated Feb. 21, 2020 for related Chinese Appln. No. 201811352881.8; 1 Page.
Extended European Search Report dated Jan. 8, 2020 for related European Appln. No. 19203004.7; 8 Pages.
Opaque: An Oblivious and Encrypted Distributed Analytics Platform—W. Zheng;; 17 Pages (NSDI 2017).
SGX-Big Matrix: A Practical Encrypted Data Analytic Framework with Trusted Processors—F Shaon; 2017; 18 Pages.
Chinese Search Report for Application No. CN 201811352881.8, dated Sep. 6, 2019, 2 Pages.
First Office Action for Chinese Application No. 201811352881.8, dated Sep. 17, 2019, 5 Pages.
Tian et al., "A Survey of Confidentiality Protection for Cloud Databases," Jisuanji Xuebao/Chinese Journal of Computers, Oct. 2017, pp. 2245-2270, vol. 40 (5 Pages).

* cited by examiner

SPARK QUERY METHOD AND SYSTEM SUPPORTING TRUSTED COMPUTING

CROSS-REFERENCE TO RELATED APPLICATION

This application claims priority to Chinese Patent Application No. 201811352881.8, filed on Nov. 14, 2018, with the title of "Spark query method and system supporting trusted computing," which is incorporated herein by reference in its entirety.

FIELD OF THE DISCLOSURE

The present disclosure relates to computer application technologies, and particularly to a spark query method and system supporting trusted computing.

BACKGROUND OF THE DISCLOSURE

In recent years, along with popularization and application of the Internet, the Internet of Things and intelligent terminal devices, data are generated at a faster and faster speed and in a larger and larger volume. In order to provide a TB-level big data query, the spark architecture is mainly used to process data in parallel in a large scale. Spark is a general-purpose parallel framework which is similar to Hadoop MapReduce and open sourced by UC Berkeley AMPLab.

However, safety of an underlying operator of a spark query can never be guaranteed in the prior art. During the running process, data in the computing may be obtained by performing memory dump (obtaining memory mirror), and the security of the computing cannot be guaranteed.

SUMMARY OF THE DISCLOSURE

Aspects of the present disclosure provide a trusted computing-based spark query method, system, device and storage medium, which can implement safety of the computing in spark query.

According to an aspect of the present invention, there is provided a trusted computing-based spark query method, comprising:

receiving a SQL query statement input by a user; performing parsing, logical plan analysis, logical plan optimization and physical plan generation for the SQL query statement; re-implementing an operator in the physical plan by using SGX API, and generating an execution code; invoking an enclave trusted environment to implement trusted computing for the operator, and executing the execution code.

The above aspect and any possible implementation mode further provide an implementation mode: the receiving a SQL query statement input by a user comprises:

a spark scheduling server receiving a query statement which is input by the user through a spark client and described in SQL.

The above aspect and any possible implementation mode further provide an implementation mode: the performing parsing, logical plan analysis, logical plan optimization and physical plan generation for the SQL query statement comprises:

an SQL parser performing parsing for the SQL query statement, and generating an unparsed logical plan;

a Catalyst analyzer performing binding in conjunction with a data dictionary (catalog), and generating a parsed logical plan;

a Catalyst optimizer performing optimization for the parsed logical plan, and obtaining an optimized logical plan according to optimization rules;

using a Spark Planner to convert the optimized logical plan into a physical plan.

The above aspect and any possible implementation mode further provide an implementation mode: the re-implementing an operator in the physical plan by using SGX API comprises:

locating and extracting an operator from the physical plan;

re-implementing the extracted operator by using the SGX API and generating an execution code;

segmenting and packaging a data file corresponding to the execution code.

The above aspect and any possible implementation mode further provide an implementation mode: segmenting and packaging a data file corresponding to the execution code comprises:

setting a size of segmented data blocks according to a size of heaps configured in a memory in the enclave trusted environment, and packaging the segmented data blocks in a protobuf format.

The above aspect and any possible implementation mode further provide an implementation mode: the invoking an enclave trusted environment to implement trusted computing for the operator, and executing the execution code comprises:

sending the execution code to a spark node server, so that the spark node server executes the execution code;

invoking the enclave trusted environment for SGX remote authentication;

invoking the enclave trusted environment to calculate the re-implemented operator, and performing the spark operation according to a calculation result.

According to another aspect of the present invention, there is provided a trusted computing-based spark query system, comprising:

a receiving module configured to receive a SQL query statement input by a user; a spark converting module configured to perform parsing, logical plan analysis, logical plan optimization and physical plan generation for the SQL query statement; an SGX converting module configured to re-implement an operator in the physical plan by using SGX API, and generate an execution code; a trusted computing invoking module configured to invoke an enclave trusted environment to implement trusted computing for the operator, and execute the execution code.

The above aspect and any possible implementation mode further provide an implementation mode: the receiving module is specifically configured to:

receive a query statement which is input by the user through a spark client and described in SQL.

The above aspect and any possible implementation mode further provide an implementation mode: the spark converting module is specifically configured to:

invoke an SQL parser to perform parsing for the SQL query statement, and generate an unparsed logical plan;

invoke a Catalyst analyzer to perform binding in conjunction with a data dictionary (catalog), and generate a parsed logical plan;

invoke a Catalyst optimizer to perform optimization for the parsed logical plan, and obtain an optimized logical plan according to optimization rules;

invoke a Spark Planner to convert the optimized logical plan into a physical plan.

The above aspect and any possible implementation mode further provide an implementation mode: the SGX converting module is specifically configured to:

locate and extract an operator from the physical plan;

re-implement the extracted operator by using the SGX API and generate an execution code;

segment and package a data file corresponding to the execution code.

The above aspect and any possible implementation mode further provide an implementation mode: segmenting and packaging a data file corresponding to the execution code comprises:

setting a size of segmented data blocks according to a size of heaps configured in a memory in the enclave trusted environment, and packaging the segmented data blocks in a protobuf format.

The above aspect and any possible implementation mode further provide an implementation mode: the trusted computing invoking module is specifically configured to:

send the execution code to a spark node server, so that the spark node server executes the execution code;

invoke the enclave trusted environment for SGX remote authentication;

invoke the enclave trusted environment to calculate the re-implemented operator, and perform the spark operation according to a calculation result.

According to a further aspect of the present invention, there is provided a computer device, comprising a memory, a processor and a computer program which is stored on the memory and runs on the processor, the processor, upon executing the program, implementing the above-mentioned method.

According to a further aspect of the present invention, there is provided a computer-readable storage medium on which a computer program is stored, the program, when executed by a processor, implementing the aforesaid method.

As can be seen from the above introduction, the solutions of the present disclosure may be employed to achieve the safety of computing in the spark query.

DETAILED DESCRIPTION

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

Figure 1:
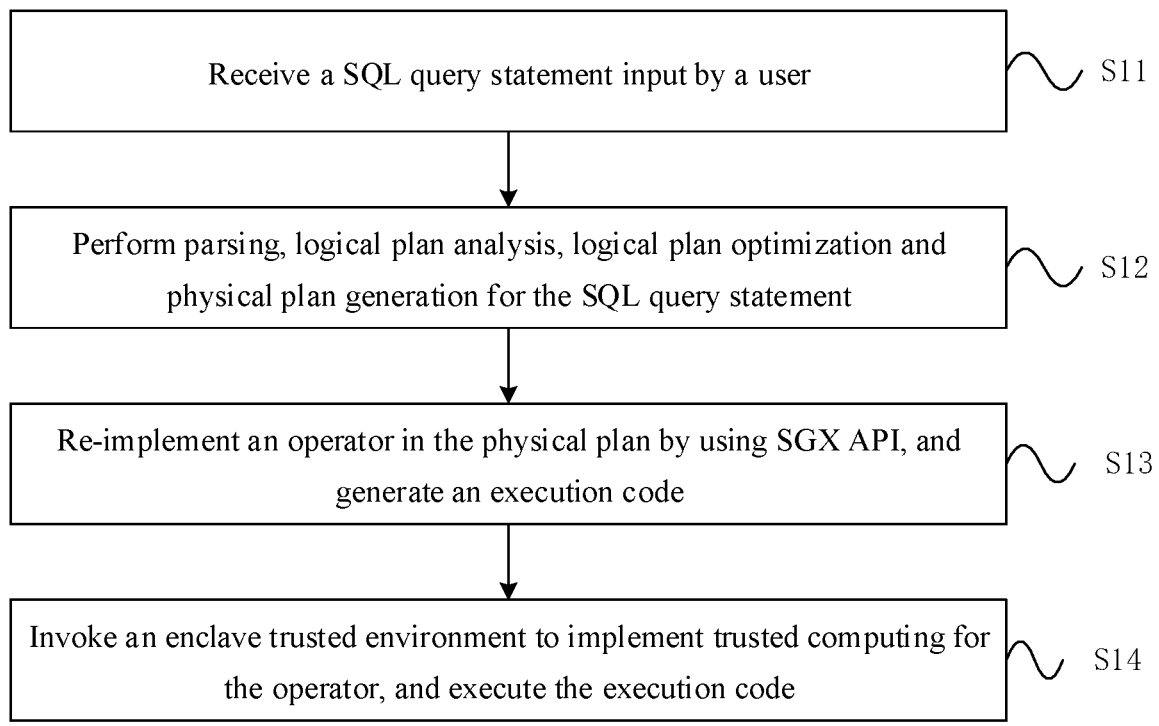
FIG. 1 is a flow chart of a trusted computing-based spark query method according to some embodiments of the present disclosure.

FIG. 1 is a flow chart of a trusted computing-based spark query method according to some embodiments of the present disclosure. As shown in FIG. 1, the method comprises the following steps:

Step S11: receiving a SQL query statement input by a user;

Step S12: performing parsing, logical plan analysis, logical plan optimization and physical plan generation for the SQL query statement;

Step S13: re-implementing an operator in the physical plan by using SGX API, and generating an execution code;

Step S14: invoking an enclave trusted environment to implement trusted computing for the operator, and executing the execution code.

The method is performed by a spark scheduling server or a node server. The spark scheduling server is configured to run a spark master process, that is, a spark main process, receive a query request from a client, and control a node server to perform a query calculation operation, wherein spark is a general-purpose parallel framework which is similar to Hadoop MapReduce and open sourced by UC Berkeley AMPLab.

In a preferred implementation of step S11,

Preferably, the client may send a query request to a node server or a spark scheduling server in a spark cluster. The query request is a query statement which is input by the user through the client and described in SQL (Structured Query Language).

In a preferred implementation of step S12, performing parsing, logical plan analysis, logical plan optimization and physical plan generation for the SQL query statement comprises the following sub-steps:

sub-step S121: an SQL parser performs parsing for the SQL query statement, and generates an unparsed logical plan (schema information is not extracted);

A type of a column and even a name of the column in sales are all unknown before querying table sale metadata. If the type of the column is unknown or it is not matched to an input table (or alias), the attribute is called unparsed. The Spark SQL parses these attributes by using Catalyst rules and Catalog objects that record all table metadata. After an "Unparsed Logical Plan" tree with unbound attributes and data types is built, the following rules are executed:

1. look up name relationship from the Catalog
2. Map naming attributes (such as col) to sub-items of the operator
3. Give those attributes the same value and give them a unique ID (and then perform optimization in a case for example if col=col)
4. Pass expression transfer and forcing types: for example, we can't know a return type of 1+col until we parse out col and convert its subexpression to a compatible type.

The Catalyst is a parser engine.

Sub-step S122: a Catalyst analyzer performs binding in conjunction with a data dictionary (catalog), and generates a parsed logical plan. In the process, the Schema Catalog needs to extract the Schema information;

Sub-step S123: a Catalyst optimizer performs optimization for the parsed logical plan, and obtains an optimized logical plan according to optimization rules;

In the logic optimization phase, the logic plan employs standard rule-based optimization. (Cost-based optimization is performed by generating multiple plans by rules, and then calculating their cost.) These optimizations include constant folding, predicate pushdown, project clipping, null propagation, Boolean expression simplification and other rules.

Sub-step S124: interacting with a Spark Planner, applying a strategy to a plan, and using the Spark Planner to convert the optimized logical plan into a physical plan.

During the physical plan phase, the Spark SQL uses the logical plan to generate one or more physical plans. This process employs a physical operator that matches a Spark execution engine. Then, a cost model is used to select the plan.

In a preferred implementation of step S13, an operator in the physical plan is re-implemented by using SGX API, and an execution code is generated;

In a current spark cluster, after the physical plan is generated, the next function is invoked to generate an executable physical plan. Wherein, the executable physical plan is Java bytecode for running on each machine.

In the present embodiment, in order to ensure that the first step of parsing the data into a data structure in the memory is secure, re-implementation is performed by employing SGX API in a manner of operator extension of the spark, and the performance is guaranteed not reduced. That is, the physical plan is intercepted before the executable plan is generated, the Catalyst extension is implemented, and the operator of the physical plan is converted into a computing symbol defined in a protobuf format. SGX (Intel Software Guard Extensions) may provide a trusted space on the computing platform to safeguard the confidentiality and integrity of critical code and data of the user. An API (Application Programming Interface) is some predefined functions and aims to provide an application and developer with an ability to access a set of routines based on certain software or hardware without having to access source code or understand details of an internal working mechanism.

Preferably, the following sub-steps are included:

Sub-step S131: extracting a jar packet corresponding to the physical plan, and locating and extracting a format class, namely, an operator therefrom.

The operator includes operations such as join, project, filter, agg, and sort.

Preferably, since the data used for calculation is a ciphertext file in an encrypted binary format, it is necessary to implement a manner of reading the ciphertext file by using spark. The API in Spark provides a manner of extensibly implementing self-defined reading, eg:sqlContext.read.format("com.databricks.spark.csv") is an extension class for reading a csv format.

Preferably, extracting the format class refers to defining and reading a class of a ciphertext format.

Sub-step S132: re-implementing the extracted operator by using the SGX API and generating an execution code.

Preferably, the re-implemented operator is compiled into a .so file. The spark underlying operator is re-implemented by using a SGX library to achieve SGX-based remote authentication.

Sub-step S133: segmenting and packaging a data file corresponding to the execution code.

Preferably, the re-implemented operators are generally small, and are only join, project, filter, agg, and sort operators. A data block consists of a data type (definition of the column meta), the data, a size of the whole data block and the number of bytes. Currently, packaging is performed in the protobuf format.

In the trusted environment enclave, it is ensured that the size of the data block that is put into the calculation each time does not exceed the size of a heap configured in the enclave memory.

Preferably, the protobuf format may be cross-language, support multiple development languages to read and parse, and prevent performance reduction caused by multiple times of conversion of the data format.

In a preferred implementation of step S14, an enclave trusted environment is invoked to implement trusted computing for the operator, and the execution code is executed.

Preferably, the following sub-steps are included:

Sub-step S141: sending the execution code to the node server, so that the node server executes the execution code.

Sub-step S142: invoking the enclave trusted environment for SGX remote authentication, and ensuring secure remote computing of trusted hardware.

Preferably, the remote authentication is an authentication process between an enclave provided by the node server and a third party not on the node server; generally, remote authentication needs a Quoting Enclave (QE) which performs signature verification (local verification) for an enclave-generated REPORT by using another special key Provisioning Key, and converts it to QUOTE (remote verification). Specific steps are as follows:

1. The enclave notifies an application to encrypt at a certain position outside a platform. At this point, the application establishes secure communication with the server, and the server responds to the request to authenticate that the enclave being executed has not been tampered and that the platform it is executing is legitimate;

2. The application provides the Quoting Enclave ID and authentication request for its enclave;

3. The enclave generates a list including an authentication response and a temporary public key, and the public key will later be used to protect communication between the server and the enclave. The generated hash is included in a user data portion of an EREPORT instruction. The instruction generates a report for the Quoting Enclave, and associates the list with the enclave, whereupon the enclave sends the REPORT to the application;

4. The application sends the REPORT to the Quoting Enclave for verification and signature;

5. The Quoting Enclave uses an EGETKEY instruction to retrieve its report key and validate REPORT, it creates a QUOTE structure, and signs it with its Provisioning Key before providing it to the application;

6. The application sends the QUOTE and associated list to the server for verification;

7. The server uses the authentication service provided by Intel to verify the QUOTE signature, and then uses the hash in the QUOTE user data to check the integrity of the list, to ensure that the list contains an expected response to the authentication.

Through the above steps, the remote authentication process becomes a task executed by the spark, so that the first-step execution of each spark node server naturally becomes remote authentication, thereby inserting into the original spark execution process without a blunt asynchronous implementation.

Sub-step S143: invoking the enclave trusted environment to calculate the operator, and performing the spark operation according to the calculation result.

Preferably, the enclave trusted environment is invoked to execute the execution code, and the operator in the execution code only operates after the enclave decrypts, and the calculation result is encrypted when outputted from the enclave. The enclave is an area hardware-isolated from the processing memory of the CUP, and the application may permit handling of extremely confidential details such as encryption keys, passwords and user data in the area.

Preferably, the size of the data block that is put into calculation each time does not exceed the size of a heap configured in the enclave memory.

Through the above operations, SGX-based remote authentication and secure computing are implemented during parallel data processing of the spark.

Preferably, the node server returns the execution result of the execution code to the spark scheduling server, and the spark scheduling server generates a query result according to the execution result, and sends the query result to the client.

Through the present embodiment, safety of data during the calculation is ensured while the query request is processed in parallel through the spark architecture. Moreover, the spark interface provides the user with more available service and is user-friendly.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

The above introduces the method embodiment. The solution of the present disclosure will be further described through an apparatus embodiment.

Figure 2:
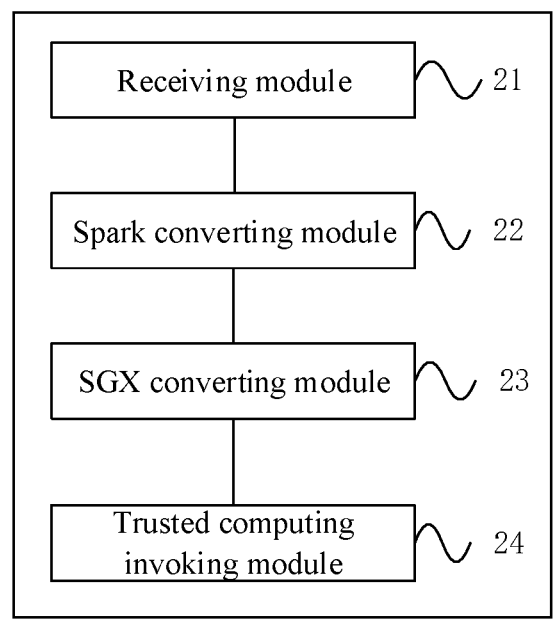
FIG. 2 is a structural diagram of a trusted computing-based spark query system according to some embodiments of the present disclosure.

FIG. 2 is a structural diagram of a trusted computing-based spark query system according to some embodiments of the present disclosure. As shown in FIG. 2, the spark query system comprises:

a receiving module 21 configured to receive a SQL query statement input by a user;

a spark converting module 22 configured to perform parsing, logical plan analysis, logical plan optimization and physical plan generation for the SQL query statement;

an SGX converting module 23 configured to re-implement an operator in the physical plan by using SGX API, and generate an execution code;

a trusted computing invoking module 24 configured to invoke an enclave trusted environment to implement trusted computing for the operator, and execute the execution code.

In a preferred implementation of the receiving module 21,

Preferably, the spark client may send a query request to a node server or a spark scheduling server in a spark cluster. The receiving module 21 receives the query request, wherein the query request is a query statement which is input by the user through the client and described in SQL (Structured Query Language).

In a preferred implementation of the spark converting module 22, the spark converting module 22 performing parsing, logical plan analysis, logical plan optimization and physical plan generation for the SQL query statement specifically comprises the following sub-steps:

invoking an SQL parser to perform parsing for the SQL query statement, and generating an unparsed logical plan (schema information is not extracted);

A type of a column and even a name of the column in sales are all unknown before querying table sale metadata. If the type of the column is unknown or it is not matched to an input table (or alias), the attribute is called unparsed. The Spark SQL parses these attributes by using Catalyst rules and Catalog objects that record all table metadata. After an "Unparsed Logical Plan" tree with unbound attributes and data types is built, the following rules are executed:

1. look up name relationship from the Catalog
2. Map naming attributes (such as col) to sub-items of the operator
3. Give those attributes the same value and give them a unique ID (and then perform optimization in a case for example if col=col)
4. Pass expression transfer and forcing types: for example, we can't know a return type of 1+col until we parse out col and convert its subexpression to a compatible type.

A Catalyst analyzer is invoked to perform binding in conjunction with a data dictionary (catalog), and generate a parsed logical plan. In the process, the Schema Catalog needs to extract the Schema information;

A Catalyst optimizer is invoked to perform optimization for the parsed logical plan, and obtain an optimized logical plan according to optimization rules;

In the logic optimization phase, the logic plan employs standard rule-based optimization. (Cost-based optimization is performed by generating multiple plans by rules, and then calculating their cost.) These optimizations include constant folding, predicate pushdown, project clipping, null propagation, Boolean expression simplification and other rules.

Interacting with a Spark Planner, applying a strategy to a plan, and invoking the Spark Planner to convert the optimized logical plan into a physical plan.

During the physical plan phase, the Spark SQL uses the logical plan to generate one or more physical plans. This process employs a physical operator that matches a Spark execution engine. Then, a cost model is used to select the plan.

In a preferred implementation of the SGX converting module 23, the SGX converting module 23 re-implements an operator in the physical plan by using SGX API, and generates an execution code;

In a current spark cluster, after the physical plan is generated, the next function is invoked to generate an executable physical plan. Wherein, the executable physical plan is Java bytecode for running on each machine.

In the present embodiment, in order to ensure that the first step of parsing the data into a data structure in the memory is secure, re-implementation is performed by employing SGX API in a manner of operator extension of the spark, and the performance is guaranteed not reduced. That is, the physical plan is intercepted before the executable plan is generated, the Catalyst extension is implemented, and the operator of the physical plan is converted into a computing symbol defined in a protobuf format.

Preferably, the SGX converting module 23 is specifically configured to:

extract a jar packet corresponding to the physical plan, and locate and extract a format class, namely, an operator therefrom.

The operator includes operations such as join, project, filter, agg and sort.

Preferably, since the data used for calculation is a ciphertext file in an encrypted binary format, it is necessary to implement a manner of reading the ciphertext file by using spark. The API in Spark provides a manner of extensibly implementing self-defined reading, eg:sqlContext.read.format("com.databricks.spark.csv") is an extension class for reading a csv format.

Preferably, extracting the format class refers to defining and reading a class of a ciphertext format.

The extracted operator is re-implemented by using the SGX API, and an execution code is generated.

Preferably, the re-implemented operator is compiled into a .so file. The spark underlying operator is re-implemented by using a SGX library to achieve SGX-based remote authentication.

A data file corresponding to the execution code is segmented and packaged.

Preferably, the re-implemented operators are generally small, and are only join, project, filter, agg and sort operators. A data block consists of a data type (definition of the column meta), the data, a size of the whole data block and the number of bytes. Currently, packaging is performed in the protobuf format.

In the trusted environment enclave, it is ensured that the size of the data block that is put into the calculation each time does not exceed the size of a heap configured in the enclave memory.

Preferably, the protobuf format may be cross-language, support multiple development languages to read and parse, and prevent performance reduction caused by multiple times of conversion of the data format.

In a preferred implementation of the trusted computing invoking module 24, the trusted computing invoking module 24 invokes an enclave trusted environment to implement trusted computing for the operator, and executes the execution code.

Preferably, the SGX converting module 24 is specifically configured to:

send the execution code to the node server, so that the node server executes the execution code;

invoke the enclave trusted environment for SGX remote authentication, and ensure secure remote computing of trusted hardware.

Preferably, the remote authentication is an authentication process between an enclave provided by the node server and a third party not on the node server; generally, remote authentication needs a Quoting Enclave (QE) which performs signature verification (local verification) for an enclave-generated REPORT by using another special key Provisioning Key, and converts it to QUOTE (remote verification). Specific steps are as follows:

1. The enclave notifies an application to encrypt at a certain position outside a platform. At this point, the application establishes secure communication with the server, and the server responds to the request to authenticate that the enclave being executed has not been tampered and that the platform it is executing is legitimate;
2. The application provides the Quoting Enclave ID and authentication request for its enclave;
3. The enclave generates a list including an authentication response and a temporary public key, and the public key will later be used to protect communication between the server and the enclave. The generated hash is included in a user data portion of an EREPORT instruction. The instruction generates a report for the Quoting Enclave, and associates the list with the enclave, whereupon the enclave sends the REPORT to the application;
4. The application sends the REPORT to the Quoting Enclave for verification and signature;
5. The Quoting Enclave uses an EGETKEY instruction to retrieve its report key and validate REPORT, it creates a QUOTE structure, and signs it with its Provisioning Key before providing it to the application;
6. The application sends the QUOTE and associated list to the server for verification;
7. The server uses the authentication service provided by Intel to verify the QUOTE signature, and then uses the hash in the QUOTE user data to check the integrity of the list, to ensure that the list contains an expected response to the authentication.

Through the above steps, the remote authentication process becomes a task executed by the spark, so that the first-step execution of each spark node server naturally becomes remote authentication, thereby inserting into the original spark execution process without a blunt asynchronous implementation.

The enclave trusted environment is invoked to calculate the operator, and the spark operation is performed according to the calculation result.

Preferably, the enclave trusted environment is invoked to execute the execution code, and the operator in the execution code only operates after the enclave decrypts, and the calculation result is encrypted when outputted from the enclave. The enclave is an area hardware-isolated from the processing memory of the CUP, and the application may permit handling of extremely confidential details such as encryption keys, passwords and user data in the area.

Preferably, the size of the data block that is put into calculation each time does not exceed the size of a heap configured in the enclave memory.

Through the above operations, SGX-based remote authentication and secure computing are implemented during parallel data processing of the spark.

Preferably, the node server returns the execution result of the execution code to the spark scheduling server, and the spark scheduling server generates a query result according to the execution result, and sends the query result to the client.

Through the present embodiment, safety of data during the calculation is ensured while the query request is processed in parallel through the spark architecture. Moreover, the spark interface provides the user with more available service and is user-friendly.

Those skilled in the art can clearly understand that for purpose of convenience and brevity of depictions, reference may be made to corresponding process in the aforesaid method embodiment for specific operation procedures of the terminal and server.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 3:
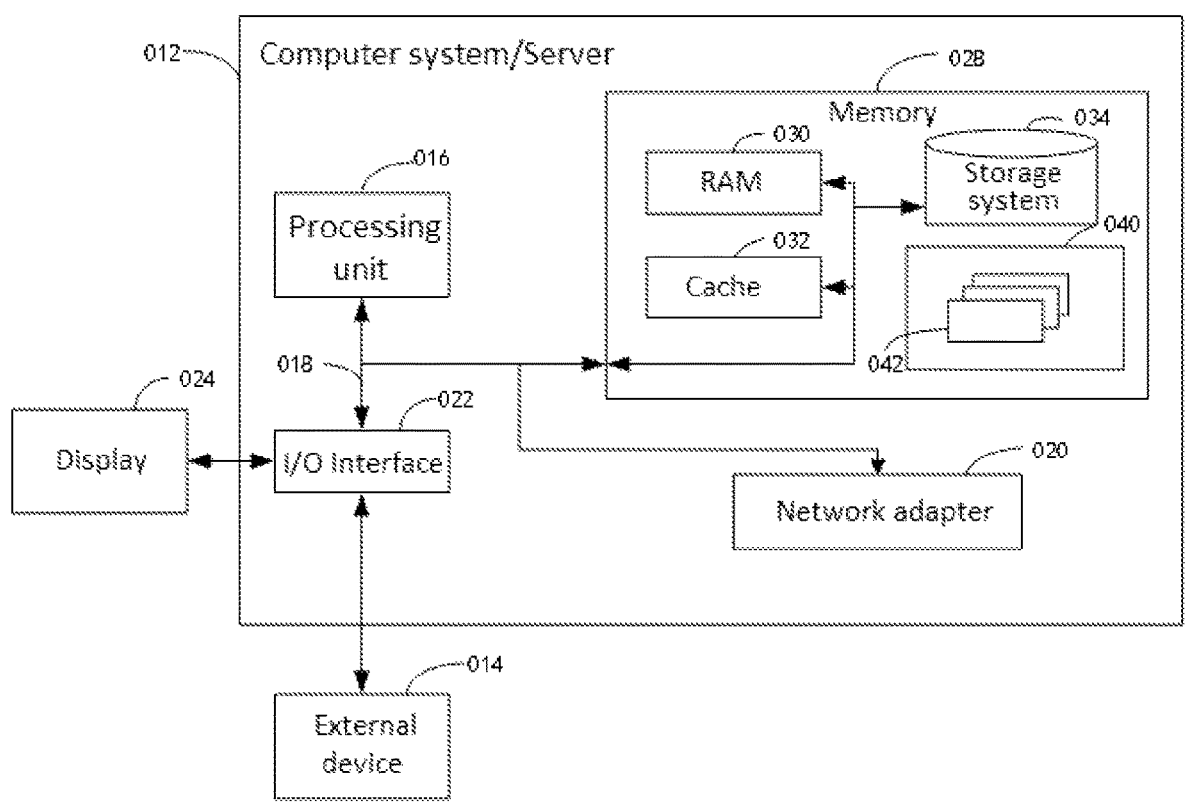
FIG. 3 illustrates a block diagram of an example computer system/server 012 adapted to implement an implementation mode of the present disclosure.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 may include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 may be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication may occur via Input/Output (I/O) interfaces 022. Still yet, computer system/server 012 may communicate with one or more networks such as a local area network (LAN), a general wide area network (WAN), and/or a public network (e.g., the Internet) via network adapter 020. As depicted in FIG. 3, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data backup storage systems, etc.

The processing unit 016 executes the functions and/or methods described in the embodiments of the present disclosure by running programs stored in the memory 028.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding processes in the aforesaid method embodiments for specific operation procedures of the means and units.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, and the parts shown as units may be or may not be physical units, i.e., they can be located at one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A trusted computing-based spark query method, wherein the method comprises:
receiving a SQL query statement input by a user;
performing parsing, logical plan analysis, logical plan optimization and physical plan generation for the SQL query statement;
re-implementing an operator in the physical plan by using Intel Software Guard Extensions Application Program Interface (SGX API), and generating an execution code;
invoking an enclave trusted environment to implement trusted computing for the operator, and executing the execution code,
wherein the performing parsing, logical plan analysis, logical plan optimization and physical plan generation for the SQL query statement comprises:
an SQL parser performing parsing for the SQL query statement, and generating an unparsed logical plan;
a Catalyst analyzer performing binding in conjunction with a data dictionary, and generating a parsed logical plan;
a Catalyst optimizer performing optimization for the parsed logical plan, and obtaining an optimized logical plan according to optimization rules; and
using a Spark Planner to convert the optimized logical plan into a physical plan.

2. The method according to claim 1, wherein the receiving a SQL query statement input by a user comprises:
a spark scheduling server receiving a query statement which is input by the user through a spark client and described in SQL.

3. The method according to claim 1, wherein the re-implementing an operator in the physical plan by using SGX API comprises:
locating and extracting an operator from the physical plan;
re-implementing the extracted operator by using the SGX API and generating an execution code;
segmenting and packaging a data file corresponding to the execution code.

4. The method according to claim 3, wherein segmenting and packaging a data file corresponding to the execution code comprises:
setting a size of segmented data blocks according to a size of heaps configured in a memory in the enclave trusted environment, and packaging the segmented data blocks in a protobuf format.

5. The method according to claim 1, wherein the invoking an enclave trusted environment to implement trusted computing for the operator, and executing the execution code comprise:
sending the execution code to a spark node server, so that the spark node server executes the execution code;
invoking the enclave trusted environment for SGX remote authentication;
invoking the enclave trusted environment to calculate the re-implemented operator, and performing the spark operation according to a calculation result.

6. A computer device, comprising a memory, a processor and a computer program which is stored on the memory and runs on the processor, wherein the processor, upon executing the program, implements a trusted computing-based spark query method, wherein the method comprises:
receiving a SQL query statement input by a user;
performing parsing, logical plan analysis, logical plan optimization and physical plan generation for the SQL query statement;
re-implementing an operator in the physical plan by using Intel Software Guard Extensions Application Program Interface (SGX API), and generating an execution code;
invoking an enclave trusted environment to implement trusted computing for the operator, and executing the execution code,
wherein the performing parsing, logical plan analysis, logical plan optimization and physical plan generation for the SQL query statement comprises:

an SQL parser performing parsing for the SQL query statement, and generating an unparsed logical plan;

a Catalyst analyzer performing binding in conjunction with a data dictionary, and generating a parsed logical plan;

a Catalyst optimizer performing optimization for the parsed logical plan, and obtaining an optimized logical plan according to optimization rules; and using a Spark Planner to convert the optimized logical plan into a physical plan.

7. A non-transitory computer-readable storage medium on which a computer program is stored, wherein the program, when executed by a processor, implements a trusted computing-based spark query method, wherein the method comprises:

receiving a SQL query statement input by a user;

performing parsing, logical plan analysis, logical plan optimization and physical plan generation for the SQL query statement;

re-implementing an operator in the physical plan by using Intel Software Guard Extensions Application Program Interface (SGX API), and generating an execution code;

invoking an enclave trusted environment to implement trusted computing for the operator, and executing the execution code, wherein the performing parsing, logical plan analysis, logical plan optimization and physical plan generation for the SQL query statement comprises:

an SQL parser performing parsing for the SQL query statement, and generating an unparsed logical plan;

a Catalyst analyzer performing binding in conjunction with a data dictionary, and generating a parsed logical plan;

a Catalyst optimizer performing optimization for the parsed logical plan, and obtaining an optimized logical plan according to optimization rules; and using a Spark Planner to convert the optimized logical plan into a physical plan.

\* \* \* \* \*